(12) United States Patent
Rattay

(10) Patent No.: US 6,312,023 B1
(45) Date of Patent: Nov. 6, 2001

(54) AXIAL COMPENSATOR

(76) Inventor: Hans Rattay, Minnekenstege 69, D-46569 Hünxe (DE)

( * ) Notice: Subject to any disclaimer, the term of this patent is extended or adjusted under 35 U.S.C. 154(b) by 0 days.

(21) Appl. No.: 09/424,273
(22) PCT Filed: May 9, 1998
(86) PCT No.: PCT/EP98/02719
  § 371 Date: Nov. 18, 1999
  § 102(e) Date: Nov. 18, 1999
(87) PCT Pub. No.: WO98/54507
  PCT Pub. Date: Dec. 3, 1998

(30) Foreign Application Priority Data

May 31, 1997 (DE) ............................................. 197 22 967

(51) Int. Cl.$^7$ ................................................. F16L 27/12
(52) U.S. Cl. ........................................... 285/299; 285/301
(58) Field of Search ................................. 285/299, 300, 285/301

(56) References Cited

U.S. PATENT DOCUMENTS

| | | | |
|---|---|---|---|
| 3,469,862 | * | 9/1969 | Conebeer ......................... 285/301 X |
| 4,350,372 | * | 9/1982 | Logdson ......................... 285/301 X |
| 4,526,409 | * | 7/1985 | Schaefer ......................... 285/301 X |
| 5,286,071 | * | 2/1994 | Storage ............................... 285/226 |
| 5,370,427 | * | 12/1994 | Hoelle et al. ......................... 285/301 |
| 5,482,330 | * | 1/1996 | Holzhausen ..................... 285/299 X |
| 6,109,661 | * | 8/2000 | Cwik et al. ..................... 285/299 X |

FOREIGN PATENT DOCUMENTS

| | | |
|---|---|---|
| G 86 32 567.1 | 3/1987 | (DE) . |
| 0 108 829 A1 | 5/1984 | (EP) . |
| 1 531 792 | 11/1978 | (GB) . |

* cited by examiner

*Primary Examiner*—Lynne H. Browne
*Assistant Examiner*—David E. Bochna
(74) *Attorney, Agent, or Firm*—Herbert Dubno; Andrew Wilford

(57) ABSTRACT

An axial compensator has a corrugated compensator tube extending along an axis and having a pair of opposite ends and respective pipe sleeves fixed to the ends and movable axially toward and away from each other with axial elastic deformation of the compensator tube. An inner guide tube fixed to one of the sleeves, generally centered on the axis, and projecting axially toward the other sleeve is formed with a plurality of radially outwardly projecting formations spaced axially from the one sleeve and defining respective radially outwardly open gaps. An outer guide tube fixed to the other of the sleeves, generally centered on the axis, and telescopingly engaging the inner guide tube is formed with radially inwardly projecting formations spaced axially from the one sleeve, defining respective radially outwardly open gaps, and aligned axially and engageable axially with the inner-tube formations. The gaps have an angular dimension at least as great as an angular dimension of the formations.

5 Claims, 3 Drawing Sheets

AXIAL COMPENSATOR

The invention relates to an axial compensator, in particular for piping systems conveying gaseous or liquid mediums, which is generally comprised of at least one corrugated compensator tube extending between two pipe sleeves formed as weld-connector ends and with telescoping, inner, tubular, and interfitting guides interconnecting the pipe sleeves.

BACKGROUND OF THE INVENTION

In order to compensate for axially effective pipe deformations so-called axial compensators are built into a piping system. Among the known types are the stuffing-box type which can as a result of its construction permit considerable axial displacements but which at the same time seals poorly and only reacts and adjusts in response to considerable forces sufficient to overcome friction.

Smaller axial displacements are taken care of by corrugated compensator tubes with no internal guide. Such compensators are dangerous in that they can be kinked if not guided and supported perfectly.

In addition there are corrugated compensator tubes with internal guides wherein inner overlapping tubular extensions interconnect the connector sleeves inside the corrugated compensator tube and serve as an axial guide. The considerable disadvantage of compensators with internal guiding is that the guides do not limit inward or outward movement and in particular under large pressurization and correspondingly large movements the corrugated compensator tube can be destroyed by being stretched too much. This disadvantage can only be alleviated by the use of expensive devices built onto the outside of the corrugated tube compensator.

OBJECTS OF THE INVENTION

It is an object of the invention to provide an axial compensator that can be subjected to high pressures and substantial axial movements, which is of simple and inexpensive construction, and which in addition allows relief in the piping system of even very small axial forces.

SUMMARY OF THE INVENTION

This object is achieved in that the telescoping guides are each provided at an end with at least two offset flange-like spacing noses, the spacing noses extending over a shorter arc than gaps formed between the spacing noses, and that the spacing noses are set by twisting through their arc in end positions limiting a slide travel. In addition to the use of a compensator with a corrugated-tube hose the invention allows the ganging of several corrugated compensator tubes to compensate for substantial movements, the forces being transmitted by the various connections of the guides to each corrugated compensator tube. This reduces the adjustment forces such that the movements are only applied to the acting corrugated compensator tubes. This thus reduces the load on the piping system.

The particular advantage of the guiding is that axial forces are compensated for and simultaneously the guides act as travel limiters. Such guides with limiters can be used anywhere where length changes, for instance caused thermally, have to be dealt with.

Particular embodiments of the pipe or tube elements carrying the guides are thus necessary when several corrugated compensator tubes are used to compensate for substantial slide travels. In addition to the pipe sleeves which are soldered into the piping system, intermediate elements in the form of guide or tube elements must be provided that have guides on both ends and that simultaneously are formed as weld-connector ends for connection to the individual corrugated compensator tubes. The telescoping guides thus must have spacing noses that are set according to the limits of slide travel. A substantial number of outer or inner spacing noses on the guides improve the axial transmission of forces. In order to be able to set the interengaging and relatively slidable guides to transmit all of the possible compression or extension, additional abutments are provided for limiting angular movement. In addition it is possible that each corrugated compensator tube be provided with a protective casing and even with sensors. In addition it is advantageous to provide the interengaging guides with seals as for example O-rings.

BRIEF DESCRIPTION OF THE DRAWING

An example of the invention is shown in the drawing and more closely described in the following. There is shown in.

SPECIFIC DESCRIPTION

Figure 1:
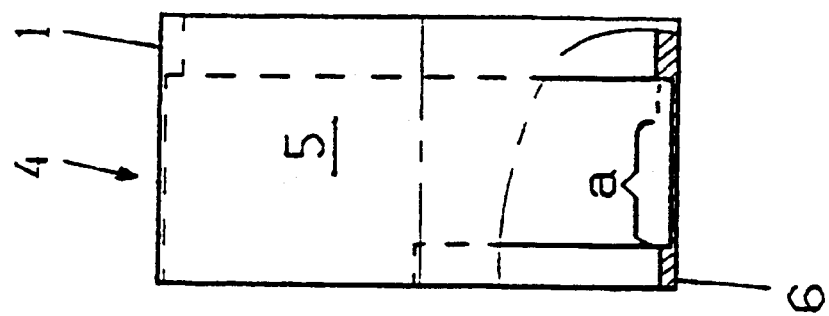
FIG. 1 an example of an axial compensator in section.
Figure 1:
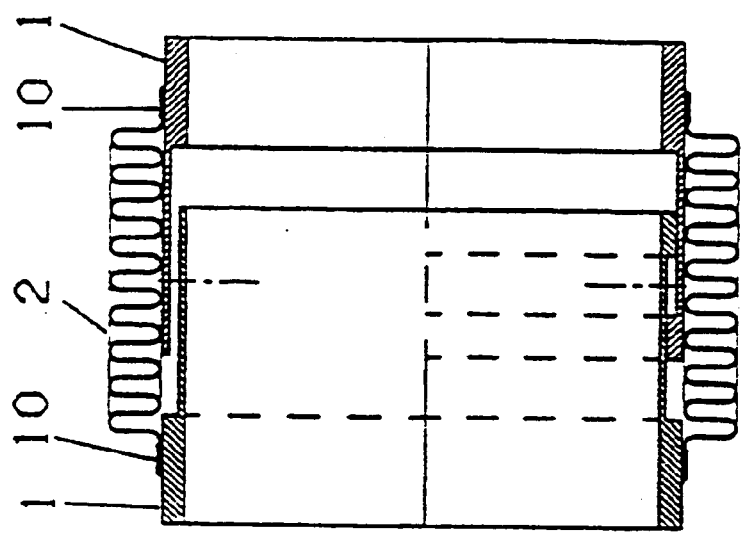
Figure 1:
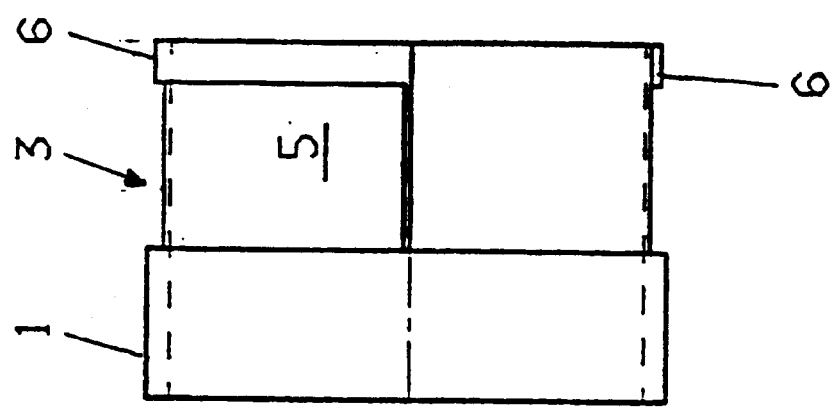
Figure 3:
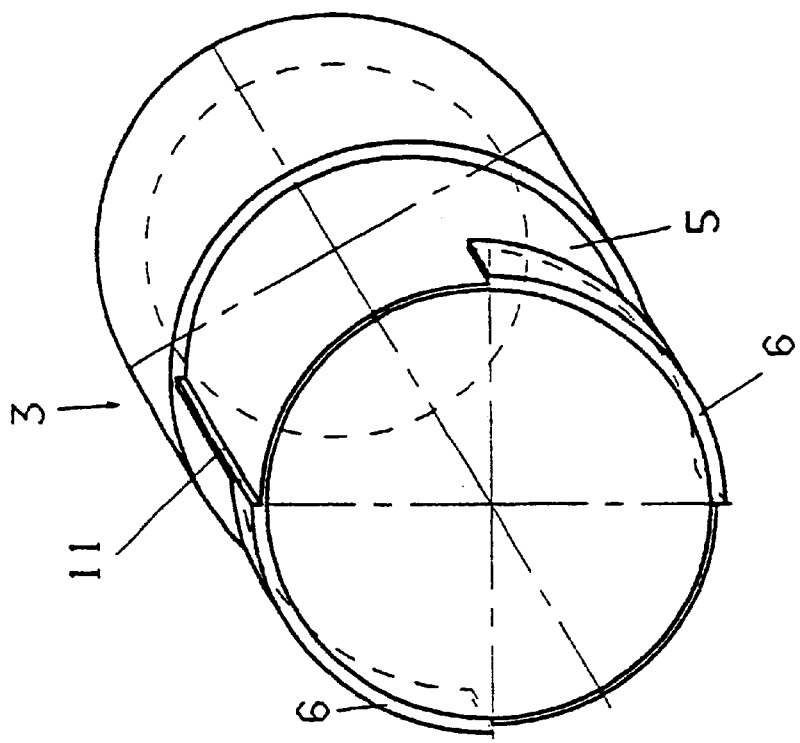
FIG. 3 an example of an inner guide element.
Figure 2:
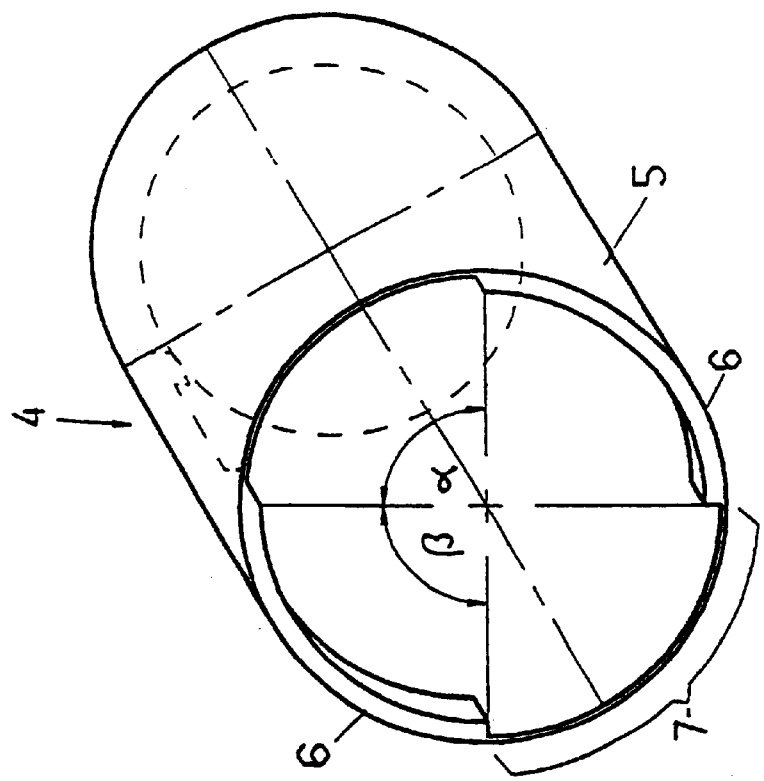
FIG. 2 an example of an outside guide element.

FIG. 1 shows a simple embodiment of an axial compensator in section along with the corresponding guides 3 and 4. The compensator is comprised basically of a corrugated compensator tube 2 extending between two pipe sleeves formed as weld-connector ends 1. The corrugated connector tube 2 has welded-on rings 10 for connection with the connector ends 1. The tubular elements functioning as guides 3 and 4 have adjacent the connector ends telescoping inner and outer tubes 5 whose ends are formed with flange-like spacing noses 6. The spacing noses 6 are on the outside of the inner guide element 3 and on the inside of the outer guide element 4. The spacing noses 6 are as better shown in FIGS. 3 and 4 aligned with each other in the tubes 5 and the gaps 7 between the (spacing noses 6 have a greater angular dimension a than the spacing noses 6 which have an angular dimension $\beta$. The number of spacing noses that are set diametrally opposite each other on the tubes 5 can be varied, axial stability increasing with the number.

Figure 4:
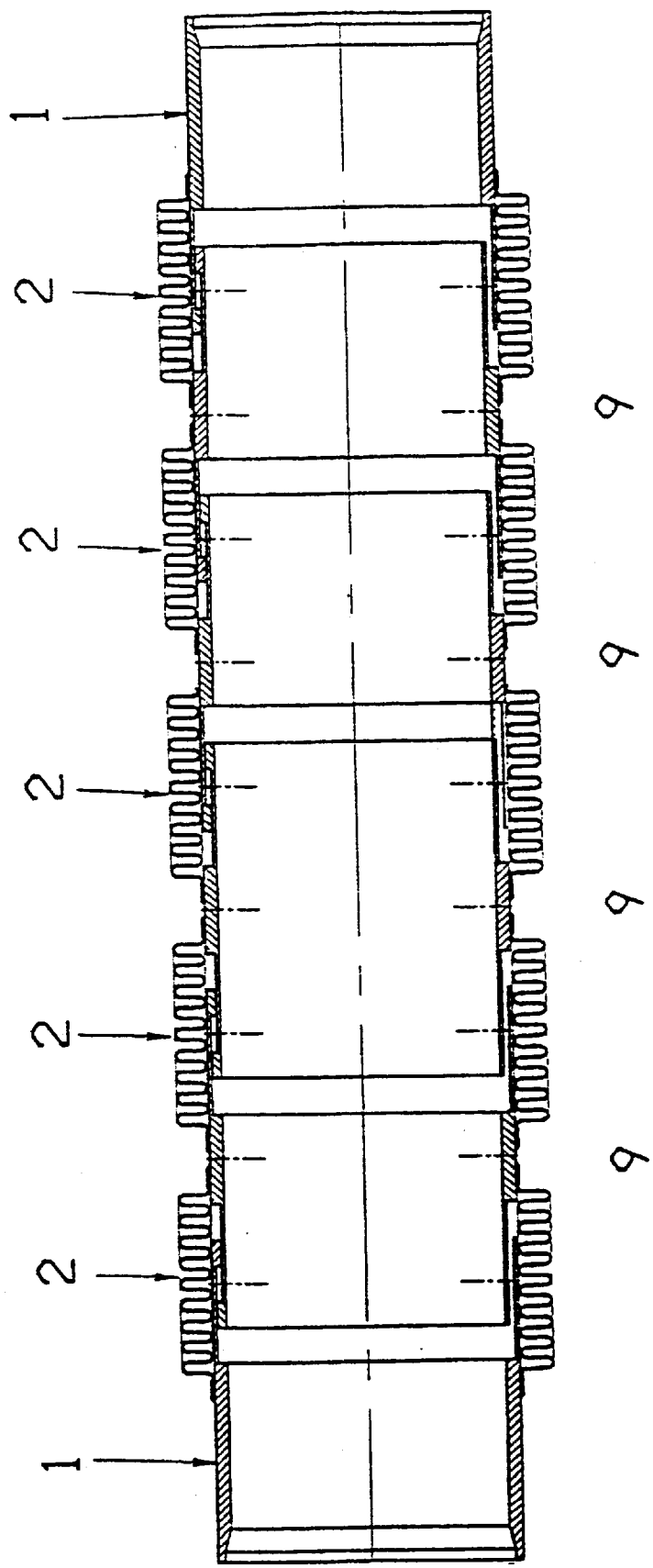
FIG. 4 a further example of an axial compensator with several corrugated compensator tubes and a considerable slide travel.

In order to assemble a compensator the inner guide element 4 is fitted into the outer guide element 3 and the two are relatively turned until the spacing nose 6 of the outer guide element 4 engages an abutment 11. The slide travel a is limited on extension and contraction by the spacing noses 6 of the guide elements 3 and 4. FIG. 4 shows a further embodiment of an axial compensator in section which for example is comprised of five corrugated compensator tubes 2 and is intended to provide substantial slide travel to compensate for length changes. To this end pipe elements or tube sections 9 are used on all but the guide elements 3 and 4 connected to the weld connector ends 1 and serve not only to mount the corrugated compensator tubes 2 but also to guide telescopingly. The idea of the spacing noses 6 defining a slide travel a is employed in the same form.

The possibility of providing any number of corrugated compensator tubes allows the compensator to be set up for any necessary length change in the piping system.

The particular advantages of such an arrangement are the reduction of the compensation force so that the piping system is not excessively stressed.

The above-mentioned protective casing can also surround the compensator on the outside and serve as an outside guide while simultaneously protecting the compensator from dirt.

Reference Character List 1 weld-connector end
2 corrugated compensator tube
3 guide
4 guide
5 tube
6 spacing nose
7 space
8 slide travel
9 guide element
10 welded-on ring
11 abutment
a slide travel

What is claimed is:

1. An axial compensator comprising:
    a corrugated compensator tube extending along an axis and having a pair of opposite ends;
    respective pipe sleeves fixed to the ends and movable axially toward and away from each other with axial elastic deformation of the compensator tube;
    an inner guide tube fixed to one of the sleeves, generally centered on the axis, projecting axially toward the other sleeve inside the compensator tube, and formed with
        a plurality of radially outwardly projecting formations spaced axially from the one sleeve and defining respective radially outwardly and axially open gaps and
        a radially outwardly open groove between the formations and the inner guide tube and open axially only at the gaps;
    an outer guide tube fixed to the other of the sleeves, generally centered on the axis, telescopingly engaging the inner guide tube inside the compensator tube, and formed with
        radially inwardly projecting formations spaced axially from the one sleeve and defining respective radially inwardly and axially open gaps having an angular dimension at least as great as an angular dimension of the formations and
        a radially inwardly open groove between the respective formations and the outer guide tube and open axially only at the gaps, the formations of each tube being displaceable axially freely through the gaps of the other tube and engageable in the grooves of the other tube, the tubes being relatively rotatable to capture the formations of each tube in the groove behind the formations of the other tube.

2. The axial compensator defined in claim 1 wherein the formations are angularly equispaced and all of substantially the same angular dimension.

3. The axial compensator defined in claim 1 wherein one of the guide tubes is formed in the respective groove with an abutment limiting relative angular displacement of the formation of the other guide tube.

4. An axial compensator comprising:
    a plurality of corrugated compensator tube extending along an axis and each having a pair of opposite ends;
    respective sleeves fixed to the ends and movable axially toward and away from each other with axial elastic deformation of the compensator tubes;
    respective inner guide tubes fixed to one end of each of the sleeves, generally centered on the axis, projecting axially inside the compensator tube, and each formed with
        a plurality of radially outwardly projecting formations spaced axially from the respective sleeve and defining respective radially outwardly and axially open gaps and
        a radially outwardly open groove between the formations and the inner guide tube and open axially only at the gaps;
    respective outer guide tubes fixed to the other end of each of the sleeves, generally centered on the axis, telescopingly engaging the inner guide tubes inside the compensator tube, and each formed with
        radially inwardly projecting formations spaced axially from the one sleeve and defining respective radially inwardly and axially open gaps having an angular dimension at least as great as an angular dimension of the formations and
        a radially inwardly open groove between the respective formations and the respective outer guide tube and open axially only at the gaps, the formations of each tube being displaceable axially freely through the gaps of the other tube and engageable in the grooves of the other tube, the tubes being relatively rotatable to capture the formations of each tube in the groove behind the formations of the other tube.

5. The axial compensator defined in claim 4, wherein the plurality of corrugated compensator tubes includes two end tubes each having an outer end, the compensator further comprising
    respective pipe sleeves fixed to the outer compensator-tube ends and having respective guide tubes telescoping with the guide tubes of the sleeves of adjacent compensator tubes.

* * * * *